(12) United States Patent
D'Agostini

(10) Patent No.: US 8,316,784 B2
(45) Date of Patent: Nov. 27, 2012

(54) OXY/FUEL COMBUSTION SYSTEM WITH MINIMIZED FLUE GAS RECIRCULATION

(75) Inventor: Mark Daniel D'Agostini, Ebensburg, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 676 days.

(21) Appl. No.: 12/238,657

(22) Filed: Sep. 26, 2008

(65) Prior Publication Data

US 2010/0077941 A1    Apr. 1, 2010

(51) Int. Cl.
*F23L 15/00* (2006.01)
*F23N 5/02* (2006.01)

(52) U.S. Cl. .................. 110/304; 110/190; 110/348

(58) Field of Classification Search .......... 110/185, 110/188, 190, 348; 431/2, 11, 207, 242
See application file for complete search history.

(56) References Cited

U.S. PATENT DOCUMENTS

| | | | |
|---|---|---|---|
| 2,865,344 A | 12/1958 | Firl | |
| 5,222,446 A * | 6/1993 | Edwards et al. | 110/235 |
| 6,042,365 A * | 3/2000 | Chen | 431/12 |
| 6,314,896 B1 | 11/2001 | Marin et al. | |
| 6,338,304 B2 * | 1/2002 | Yamamoto et al. | 110/261 |
| 6,619,041 B2 | 9/2003 | Marin et al. | |
| 7,261,046 B1 * | 8/2007 | Rettig et al. | 110/204 |
| 7,401,577 B2 * | 7/2008 | Saucedo et al. | 110/234 |
| 7,621,973 B2 * | 11/2009 | Wallace | 110/216 |
| 2001/0003265 A1 | 6/2001 | Yamamoto et al. | |
| 2004/0231332 A1 | 11/2004 | Saucedo et al. | |
| 2009/0293782 A1 * | 12/2009 | Eriksson et al. | 110/205 |

FOREIGN PATENT DOCUMENTS

| | | |
|---|---|---|
| WO | 2006054990 A1 | 5/2006 |
| WO | 2006094182 A2 | 9/2006 |

OTHER PUBLICATIONS

Kevin Boyle Fogash, Combustion System With Steam or Water Injection, U.S. Appl. No. 12/238,632, Sep. 26, 2008.
Aleksandar Georgi Slavejkov, Combustion System With Precombustor, U.S. Appl. No. 12/238,644, Sep. 26, 2008.
Mark Daniel D'Agostini, Oxy/Fuel Combustion System With Little or No Excess Oxygen, U.S. Appl. No. 12/238,612, Sep. 26, 2008.
Reed Jacob Hendershot, Convective Section Combustion, U.S. Appl. No. 12/238,671, Sep. 26, 2008.

(Continued)

*Primary Examiner* — Kenneth Rinehart
*Assistant Examiner* — David J Laux
(74) *Attorney, Agent, or Firm* — Michael K. Boyer

(57) ABSTRACT

This disclosure includes a system and method of controlling fuel combustion including providing a system, measuring a property, and providing oxygen and fuel in response to the property. The system includes a furnace arranged and disposed to receive fuel and oxygen and combust the fuel and the oxygen to form a combustion fluid, a plurality of heat exchanger sections arranged and disposed to receive heat from the combustion fluid, and a plurality of oxygen injectors arranged and disposed to controllably provide oxygen to the combustion fluid to adjust composition of the combustion fluid and temperature of the combustion fluid. The property measured is selected from the group consisting of temperature of the combustion fluid, composition of the combustion fluid, temperature of the heat exchanger sections, and combinations thereof and is performed in close proximity to the oxygen injectors.

27 Claims, 15 Drawing Sheets

OTHER PUBLICATIONS

Reed Jacob Hendershot, Oxy/Fuel Combustion System Having Combined Convective Section and Radiant Section, U.S. Appl. No. 12/238,695, Sep. 26, 2008.

Mark Daniel D'Agostini, Process Temperature Control in Oxy/Fuel Combustion System, U.S. Appl. No. 12/238,731, Sep. 26, 2008.

Mark Daniel D'Agostini, Oxygen Control System for Oxygen Enhanced Combustion of Solid Fuels, U.S. Appl. No. 12/138,755, Jun. 13, 2008.

Jeffrey William Kloosterman, Transient Operation of Oxy/Fuel Combustion System, U.S. Appl. No. 12/238,713, Sep. 26, 2008.

Mark Daniel D'Agostini, Combustion System With Precombustor, U.S. Appl. No. 61/100,372, Sep. 26, 2008.

Mark Daniel D'Agostini, Combustion System With Precombustor for Recycled Flue Gas, U.S. Appl. No. 12/566,819, Sep. 25, 2009.

* cited by examiner

OXY/FUEL COMBUSTION SYSTEM WITH MINIMIZED FLUE GAS RECIRCULATION

CROSS-REFERENCE TO RELATED APPLICATIONS

This Application is related to application Ser. No. 12/238,612, entitled "OXY/FUEL COMBUSTION SYSTEM WITH LITTLE OR NO EXCESS OXYGEN", filed contemporaneously with this Application on Sep. 26, 2008, assigned to the assignee of the present disclosure and which is herein incorporated by reference in its entirety, application Ser. No. 12/238,632, entitled "COMBUSTION SYSTEM WITH STEAM OR WATER INJECTION", filed contemporaneously with this Application on Sep. 26, 2008, assigned to the assignee of the present disclosure and which is herein incorporated by reference in its entirety, application Ser. No. 12/238,644, entitled "COMBUSTION SYSTEM WITH PRECOMBUSTOR", filed contemporaneously with this Application on Sep. 26, 2008, assigned to the assignee of the present disclosure and which is herein incorporated by reference in its entirety, application Ser. No. 12/238,671, entitled "CONVECTIVE SECTION COMBUSTION", filed contemporaneously with this Application on Sep. 26, 2008, assigned to the assignee of the present disclosure and which is herein incorporated by reference in its entirety, application Ser. No. 12/238,695, entitled "OXY/FUEL COMBUSTION SYSTEM HAVING COMBINED CONVECTIVE SECTION AND RADIANT SECTION", filed contemporaneously with this Application on Sep. 26, 2008, assigned to the assignee of the present disclosure and which is herein incorporated by reference in its entirety, application Ser. No. 12/238,731, entitled "PROCESS TEMPERATURE CONTROL IN OXY/FUEL COMBUSTION SYSTEM", filed contemporaneously with this Application on Sep. 26, 2008, assigned to the assignee of the present disclosure and which is herein incorporated by reference in its entirety, and application Ser. No. 61/100,372, entitled "COMBUSTION SYSTEM WITH PRECOMBUSTOR", filed contemporaneously with this Application on Sep. 26, 2008, assigned to the assignee of the present disclosure and which is herein incorporated by reference in its entirety,

FIELD OF THE DISCLOSURE

The present disclosure is directed to an oxy/fuel combustion system. In particular, the present disclosure is directed to an oxy/fuel combustion system with diminished or eliminated flue gas recycle.

BACKGROUND OF THE DISCLOSURE

Known oxy/fuel combustion systems include flue gas recycle equipment, flue gas recycle controls, and/or secondary fuel injection. Known systems have relied upon these features to provide desired temperatures of heat exchange surfaces. These features add to the size and complexity of a system, capital and operating costs of the system, are subject to degradation, and may increase system maintenance needs. Systems incorporating flue gas recycle, in particular, are relatively large due to the relatively large gas volume to be circulated to provide the desired heat profile.

The combustion of coal in a boiler with oxygen, so called oxy/coal combustion, presents two fundamental challenges; one is to maintain the proper balance between radiative and convective heat transfer in heating water to steam, while the other is to protect metal components in the boiler from mechanical damage resulting from the extremely high temperature oxy/fuel flame. In an air/fuel boiler converted to oxy/fuel operation, the most frequent approach is to recycle flue gas with a sufficient volumetric flow rate so that the mixture recycled to the furnace, which essentially comprises $O_2$ and $CO_2$, approximates air (for example, $O_2/N_2$). This may require a flue gas recycle mass flow rate of the order of 10-12 times the fuel flow rate.

Therefore, there is an unmet need to provide an oxy/fuel system and method of combustion that do not rely upon flue gas recycle equipment, flue gas recycle controls or secondary fuel injection to provide the desired temperatures of heat exchange surface, wherein the system is of a smaller size, lower cost, and/or more resilient, thus leading to greater efficiency.

SUMMARY OF THE DISCLOSURE

This disclosure provides an oxy/fuel system and method of combustion that do not rely upon flue gas recycle equipment, flue gas recycle controls or secondary fuel injection to provided the desired temperatures of heat exchange surface, wherein the system is of a smaller size, lower cost, and/or more resilient, thus leading to greater efficiency.

According to an embodiment, an oxy/fuel combustion system includes a furnace arranged and disposed to receive fuel and oxygen and combust the fuel and the oxygen to form a combustion fluid, a plurality of heat exchanger sections arranged and disposed to receive heat from the combustion fluid, and a plurality of oxygen injectors arranged and disposed to provide oxygen to the combustion fluid to controllably adjust composition of the combustion fluid and temperature of the combustion fluid.

According to another embodiment, a method of controlling fuel combustion includes providing a system, measuring a property, and providing oxygen, fuel, or a combination of oxygen and fuel in response to the property. In the embodiment, the system includes a furnace arranged and disposed to receive fuel and oxygen and combust the fuel and the oxygen to form a combustion fluid, a plurality of heat exchanger sections arranged and disposed to receive heat from the combustion fluid, and a plurality of oxygen injectors arranged and disposed to provide oxygen to the combustion fluid to controllably adjust composition of the combustion fluid and temperature of the combustion fluid. The property measured is selected from the group consisting of temperature of the combustion fluid, composition of the combustion fluid, temperature of the heat exchanger sections, temperature of the fluid being heated in the heat exchanger sections, temperature of a medium receiving heat from the combustion fluid, and combinations thereof and is performed in close proximity to the oxygen injectors.

An advantage of the present disclosure is the ability to have a high capacity combustion system having a decreased size.

A further advantage of the present disclosure is decreased fabrication and maintenance costs by reducing size and parts of oxy/fuel combustion systems.

Another advantage of the present disclosure is that the reduced size and reduced parts of the combustion system provide increased resilience.

Yet another advantage of the present disclosure is that the combustion system requires less gas volume for circulation without a reduction in efficiency, or overall power output.

Still yet another advantage is maintaining the proper balance between radiative and convective heat transfer in heating water to steam and protecting metal components in the boiler from mechanical damage resulting from the extremely high temperature oxy/fuel flame.

Further aspects of the method and system are disclosed herein. The features as discussed above, as well as other features and advantages of the present disclosure will be appreciated and understood by those skilled in the art from the following detailed description and drawings.

BRIEF DESCRIPTION OF THE DRAWINGS

Wherever possible, the same reference numbers will be used throughout the drawings to represent the same parts.

DETAILED DESCRIPTION OF THE DISCLOSURE

The present disclosure now will be described more fully hereinafter with reference to the accompanying drawings, in which a preferred embodiment of the disclosure is shown. This disclosure may, however, be embodied in many different forms and should not be construed as limited to the embodiments set forth herein; rather, these embodiments are provided so that this disclosure will be thorough and complete and will fully convey the scope of the disclosure to those skilled in the art.

As used herein, the term "solid fuel" and grammatical variations thereof refers to any solid fuel suitable for combustion purposes. For example, the disclosure may be used with many types of carbon-containing solid fuels, including but not limited to: anthracite, bituminous, sub-bituminous, and lignitic coals; tar; bitumen; petroleum coke; paper mill sludge solids and sewage sludge solids; wood; peat; grass; and combinations and mixtures of all of those fuels. As used herein, the term "oxygen" and grammatical variations thereof refers to an oxidizer having an $O_2$ concentration greater than that of atmospheric or ambient conditions. As used herein, the term "oxy/coal combustion" and grammatical variations thereof refers to coal combustion in oxygen, the term "air/coal combustion" and grammatical variations thereof refers to coal combustion in air, the term "oxy/fuel combustion" and grammatical variations thereof refers to fuel combustion in oxygen, and the term "air/fuel combustion" and grammatical variations thereof refers to fuel combustion in air. As used herein, the term "combustion fluid" and grammatical variations thereof refers to a fluid formed from and/or mixed with the products of combustion, which may be utilized for convective heat transfer. The term is not limited to the products of combustion and may include fluids mixed with or otherwise traveling through at least a portion of combustion system. Although not so limited, one such example is flue gas. As used herein, the term "recycled flue gas" and grammatical variations thereof refers to combustion fluid exiting the system that is recirculated to any portion of the system. As used herein, the term "flue gas recycle" and grammatical variations thereof refers to a configuration permitting the combustion fluid to be recirculated. Although various embodiments illustrate flames in particular locations, it will be appreciated that flames may be present, but not necessarily required to be present, in any place where combustion occurs.

Figure 1:
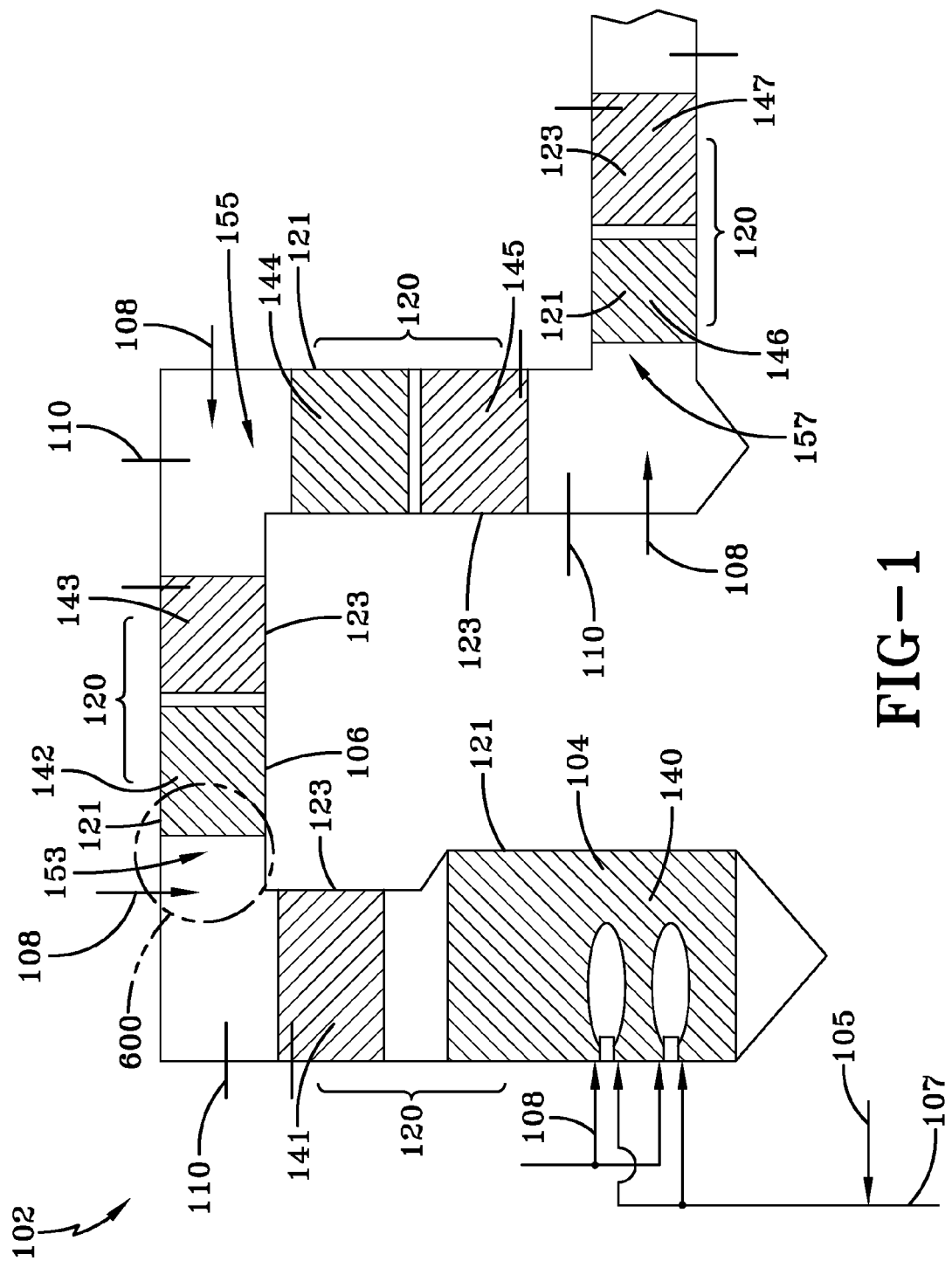
FIG. 1 schematically illustrates an exemplary embodiment of an oxy/fuel system according to the disclosure.

FIG. 1 illustrates an exemplary embodiment of an oxy/fuel combustion system 102 according to the disclosure. As illustrated in FIG. 1, oxy/fuel combustion system 102 diminishes features associated with flue gas recycle (FGR) to control and balance heat transfer rates between a furnace 104 and a convective section 106 of combustion system 102. Combustion system 102 diminishes features associated with FGR by including a plurality of fluid paths 151, 153, 155, 157 throughout combustion system 102 arranged and disposed for control of chemical heat release from fuel 107 so as to achieve desired temperatures of a combustion fluid and rates of heat exchange between the combustion fluid and water or steam in combustion system 102. The term fluid path refers to a pathway for combustion fluid or partially combusted combustion fluid. The fluid paths 151, 153, 155, and 157 may be located between heat exchanger sections and/or may be permit combustion fluid to mix with oxygen.

In the embodiment of combustion system 102 illustrated in FIG. 1, a plurality of heat exchanger sections 120 are bundled and include an upstream end 121 having liquid water heating duty and a downstream end 123 having steam heating duty.

Referring to FIG. 1, combustion system 102 uses recycled flue gas 105 for fuel 107 transport rather than for controlling heat transfer in furnace 104 and/or convective section 106. This use of FGR for transport requires a small percentage of that which would be needed for control of furnace 104 and convective section 106 heat transfer. For example, the mass flow rate of transport gas is typically less than three times the mass flow rate of fuel, and is often less than or equal to approximately two times the mass flow rate of fuel. This is in comparison to 10-12 times the mass flow rate of fuel anticipated for heat transfer control in a boiler converted from air-fuel to oxy-fuel operation. Moreover, recycled flue gas used for fuel transport includes a high degree of constancy and stability, making it generally undesirable for moderating and controlling steam temperatures.

Figure 3:
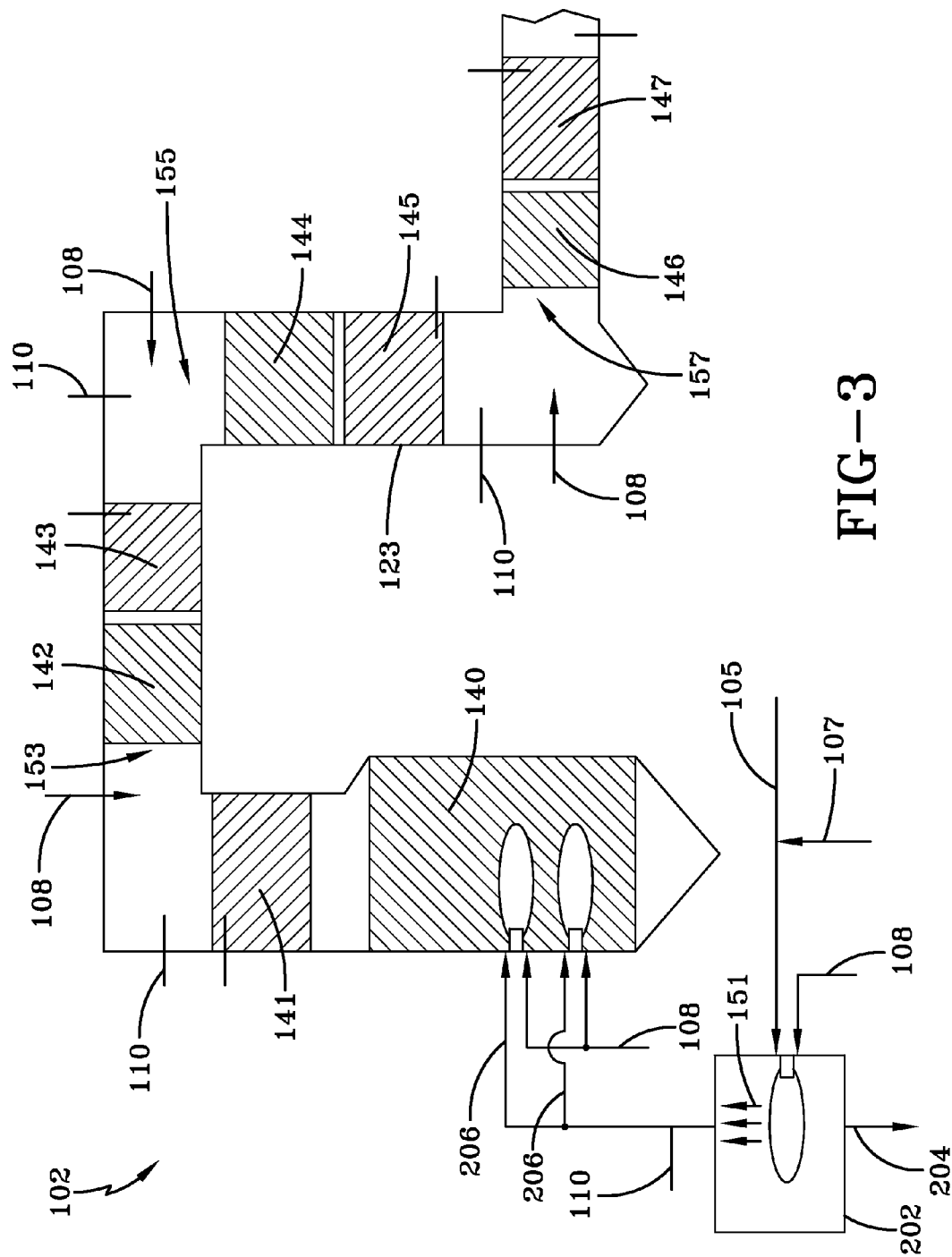
FIG. 3 schematically illustrates an exemplary embodiment of an oxy/fuel system according to the disclosure.

In furnace 104 of combustion system 102, fuel 107 and oxygen are added, oxygen being added in sub-stoichiometric amounts. Fluid paths 153, 155, 157 are arranged downstream from furnace 104 and separated from furnace 104 by heat exchanger sections 120 disposed, for example, for gas-to-liquid or gas-to-steam heat transfer. Fluid path 151, as best illustrated by the embodiment in FIG. 3, is arranged downstream from a combustion zone but upstream of at least a portion of furnace 104. Combustion system 102 desirably provides control and distribution of chemical heat release from fuel 107, via fluid paths 151, 153, 155, and/or 157. For instance, combustion system 102 provides adequate residence time for the processes of fuel mixing and combustion to be completed. In addition, the superheated steam tubes of the heat exchangers are protected from overheating due to high temperatures introduced into regions of combustion system 102 that are more conventionally maintained at lower temperatures.

Heat exchanger sections 120 may be arranged immediately downstream of each fluid path 151, 153, 155, or 157 and disposed for gas-to-liquid heat transfer. Heat exchanger section 120 is arranged with a gas-to-steam heat exchanger downstream of the gas-to-liquid heat exchanger. In yet another embodiment, combustion system 102 is arranged for steam temperature, heat exchanger surface temperature, combustion fluid temperature, and/or combustion fluid composition to be measured at a plurality of locations throughout combustion system 102 and disposed for control of oxygen injection rates and fuel injection rates. In one further embodiment, such measurements are made in close proximity to fluid paths 151, 153, 155, 157. In still yet another embodiment, furnace 104 is a slagging partial oxidation reactor located in a separate vessel from remainder of combustion system 102. In this embodiment, furnace 104 is arranged and disposed for slag to be removed and gaseous products to be discharged to combustion system 102.

Controlling energy release in combustion system 102 by controlling fluid paths 151, 153, 155, 157 downstream of furnace 104, coupled with a staging configuration of heat exchanger sections 120 permits further control. The staging configurations place water (or liquid) heating sections immediately downstream of at least some of fluid paths 151, 153, 155, 157 that are downstream of furnace 104. Management and control of oxygen injection rates is facilitated by selectively positioned process gas property measurement devices, such as, gas and combustion fluid temperatures or compositions. Use of FGR is limited to that which may be required to provide transport gas 105 to carry fuel 107, such as coal, from the fuel processing equipment (not shown) to burners discharging into furnace 104.

In the first fluid path 151 (shown in FIG. 3), fuel 107 and the combustion fluid are introduced with oxygen into furnace 104 where partial oxidation of fuel 107 takes place. In one embodiment, injecting oxygen into furnace 104 at a rate of less than or equal to 80 percent of the stoichiometric requirement for complete combustion of fuel is performed. Heating of liquid occurs within furnace 104 in a first water heating heat transfer section 140 (WH-140). Energy lost during the water-heating stage lowers the temperature of the combustion fluid sufficiently to allow subsequent vapor heating to occur in a first steam heating heat exchange section 141 (SH-141). In the second fluid path 153, oxygen injector 108, follows SH-141. The amount of oxygen introduced at the second fluid path 153 is below the amount needed for complete combustion of fuel 107. The amount of oxygen introduced at the second fluid path 153 may be above peak gas temperatures recommended for exposure to steam heating tubes. As such, in the embodiment illustrated by FIG. 1, a second water heating heat exchanger 142 (WH-142), follows the second fluid path 153. Heat exchanged between the gas and water tubes lower the gas temperature to the point where heat transfer to steam can take place in a second steam heating heat exchanger 143 (SH-143). In the third fluid path 155, oxygen injector 108 is arranged and disposed for providing sub-stoichiometric amounts of oxygen followed by a third combination of heat transfer from a third water heating heat exchanger 144 (WH-144) and a third steam heating heat exchanger 145 (SH-145). Further downstream, the fourth fluid path 157 oxygen injector 108 is arranged and disposed for providing oxygen above the amount needed for complete combustion of fuel 107 followed by a fourth combination of heat transfer from a fourth water heating heat exchanger 146 (WH-146) and a fourth steam heating heat exchanger 147 (SH-147).

Control of rates of oxygen into oxygen injector 108 at fluid paths 151, 153, 155, 157 is provided in response to measurements obtained at sensors 110 or other measuring devices. Sensors disposed for process measurement permit control of fluid paths 151, 153, 155, 157. Measurements include, but are not limited to, the steam temperature, the heat exchanger surface temperature, process combustion fluid temperature and composition, particularly the carbon monoxide (CO) and oxygen ($O_2$) concentrations. For example, considering the conditions leaving the first fluid path 151 following SH-141, if the exit steam temperature is too low, then more energy is released from fuel 107 within furnace 104. This can be accomplished via an increase in the rate of oxygen injection and/or fuel flow. The determination of whether to increase the amount or flow of fuel 107 and/or oxygen depends upon the temperature and composition of the flue gas exiting SH-141. If the measurement of this temperature and CO composition are both within a predetermined range, then either may be adjusted. In one embodiment, preference is given to adjusting the oxygen since it is less susceptible to producing upsets in the balance of the combustion system. In one example, if the temperature is near the lower end of a predetermined range and CO composition is within range, then the rate of oxygen injection is increased. As illustrated by the examples below, the range may be defined by calculations or by tests performed on the existing combustion system 102. Similarly, if the temperature is within the predetermined range but CO is near the upper end of the predetermined range, then rate of oxygen injection is increased to release the necessary energy from fuel 107. However, if both the temperature and CO are near the lower end of the predetermined range, then the injection rate of fuel 107 is increased at a fixed rate of oxygen injection. Those who are skilled in the art will appreciate that additional control responses can be developed based upon the available measurements and particular design and operating requirements of the system.

In a similar manner, measurements of temperature and CO composition throughout combustion system 102 may be made to control the other fluid paths 151, 153, 155, 157. In the region following heat exchange section 147, sensor 110 may measure CO and $O_2$ concentration. The presence of appreciable CO may, for example, indicate a need to increase oxygen flow to the final fluid path 157.

In addition to assisting in the control of rate of fuel 107 injection and rate of oxygen injection, the combustion fluid temperature measurements provides a safety function. In an embodiment, the local combustion fluid temperature fluid path 151, 153, 155, or 157 is to be at or above the auto-ignition temperature of fuel 107. The value of the auto-ignition temperature is dependent upon fuel 107, but many burner management systems require a temperature of at least 1400° F. (760° C.) to guarantee spontaneous ignition of fuel 107. Hence, the local combustion fluid temperature would serve as a validation of conformity to this requirement. If the local gas temperature is below the auto-ignition point, the use of a separate ignition source, such as a pilot burner or continuous spark or plasma, would be desirable for operating combustion system 102 and maintaining safe and stable combustion of the partially-oxidized combustion fluid with the freshly-injected oxygen stream 151, 153, 155, or 157.

Figure 2:
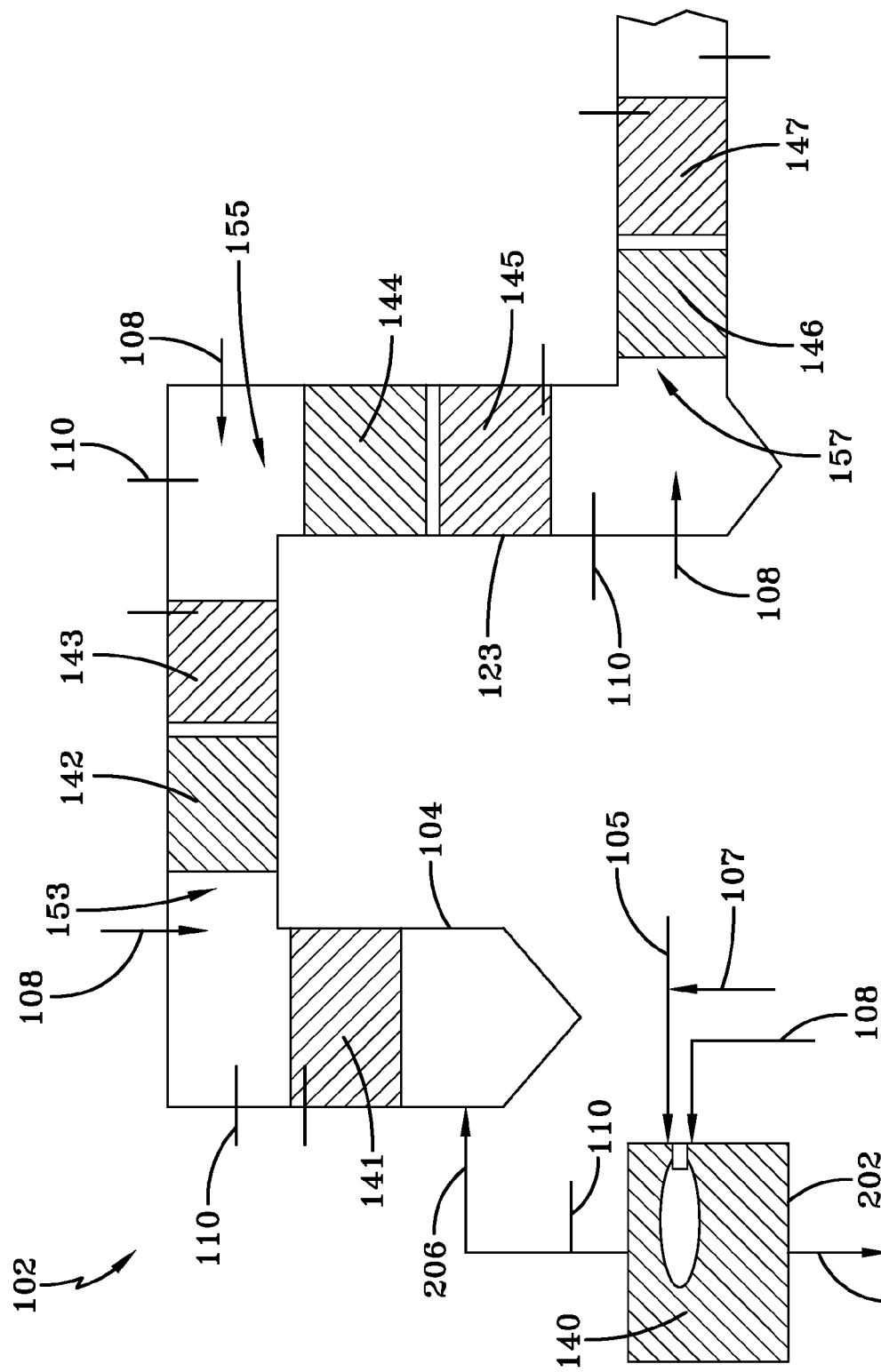
FIG. 2 schematically illustrates an exemplary embodiment of an oxy/fuel system according to the disclosure.

FIG. 2 illustrates an exemplary embodiment of an oxy/fuel combustion system 102 according to the disclosure. The system shown in FIG. 2 is similar to the system shown and described with respect to FIG. 1. In FIG. 2, combustion system 102 accomplishes injection of fuel 107 in furnace 104 after fuel 107 is initially processed in a separate chamber 202 wherein slag 204 (or other solid residue in molten form) is removed from a partially combusted combustion fluid 206. In the embodiment illustrated in FIG. 2, the first fluid path 151, fuel 107, and partially combusted combustion fluid 204 are introduced with oxygen into chamber 202 where partial oxidation of fuel 107 takes place. Heating of liquid occurs within chamber 202 in WH-140. Energy lost during the water-heating stage lowers the temperature of the combustion fluid sufficiently to allow subsequent vapor heating to occur in SH-141, which is in furnace 104, without overheating steam tubes. In this embodiment, combustion fluid temperature and composition measurements, are made between chamber 202 and the remainder of combustion system 102 to facilitate control of process conditions.

The embodiment illustrated in FIG. 2 removes slag 204 from fuel 107 thereby lowering the particulate carryover to furnace 104. Consequently, the size of downstream particulate removal equipment is reduced, as is the propensity for fouling and erosion within combustion system 102. An effect of the reduction in fouling is that spacing between tubes in the various heat exchangers may be minimized, thereby increasing combustion fluid velocity in the tube banks and reducing the overall size of combustion system 102 needed to facilitate energy transfer between gas and water or steam.

FIG. 3 illustrates a similar embodiment to the embodiment illustrated in FIG. 2 but includes WH-140 in furnace 104. Also in FIG. 3, the first fluid path 151 including oxygen is in chamber 202 for the first stage of oxidation.

Figure 4:
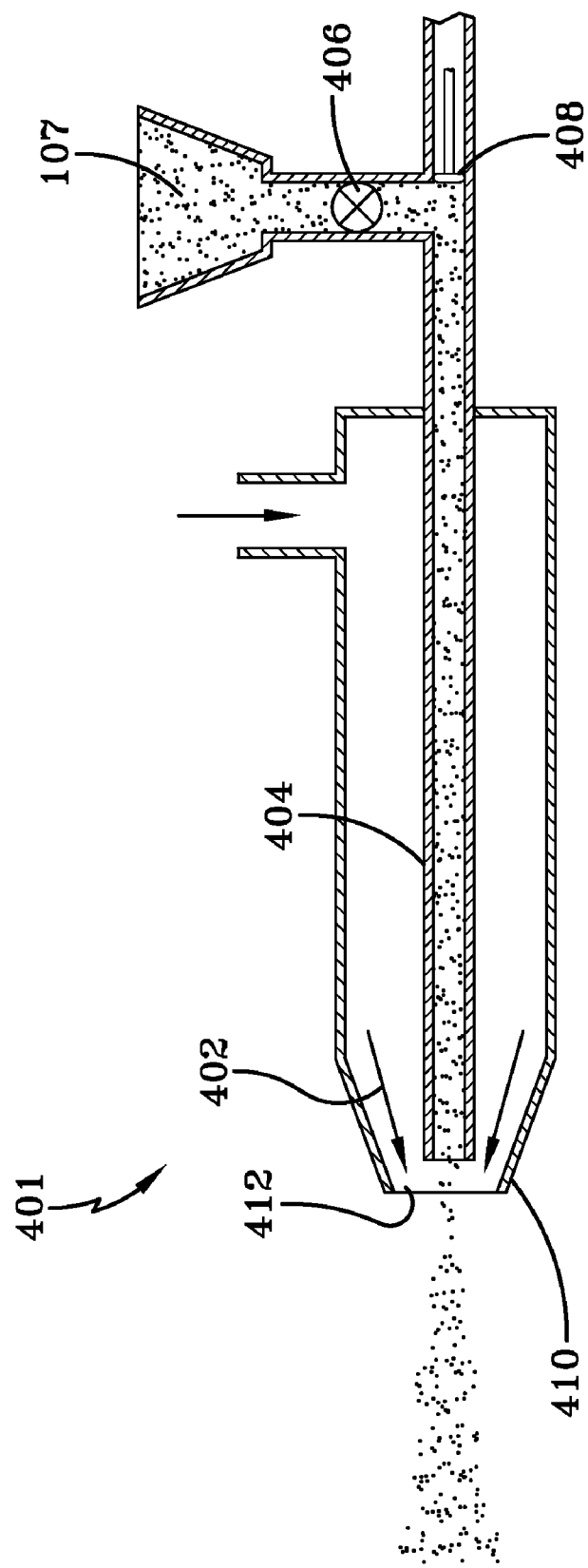
FIG. 4 schematically illustrates a fuel transport mechanism according to the disclosure.

FIG. 4 illustrates an embodiment of the disclosure that does not require the use of FGR for fuel 107 transport. In this embodiment, FGR is replaced, for example, by transporting fuel 107 using an aqueous stream, by gravity feeding of solid fuel into a burner, by mechanical means, by aspiration using oxygen or other gases (not including RFG) as the aspirant, by other systems known in the art, and/or by combinations thereof. FIG. 4 illustrates a device 401 arranged and disposed for fuel 107 to be fed into a fuel conduit 404. The device 401 is depicted as a hopper with a rotary valve 406 but may be any other fuel delivery device. As illustrated in FIG. 4, a push rod 408, or a piston, transports fuel 107 to a nozzle end 410 of fuel conduit 404. A gaseous fluid stream 402 flows in an annulus 412 along the outside of fuel conduit 404 and joins fuel 107 at nozzle end 410. The high velocity of gaseous fluid stream 402 creates suction that draws fuel 107 out of fuel conduit 404 and disperses it into a flowing gas/solid mixture emanating from nozzle end 410. The same system may be used without push rod 408 if the orientation of the burner device is vertical rather than horizontal. The use of hopper of FIG. 4 permits the complete elimination of FGR from combustion system 102.

Figure 5:
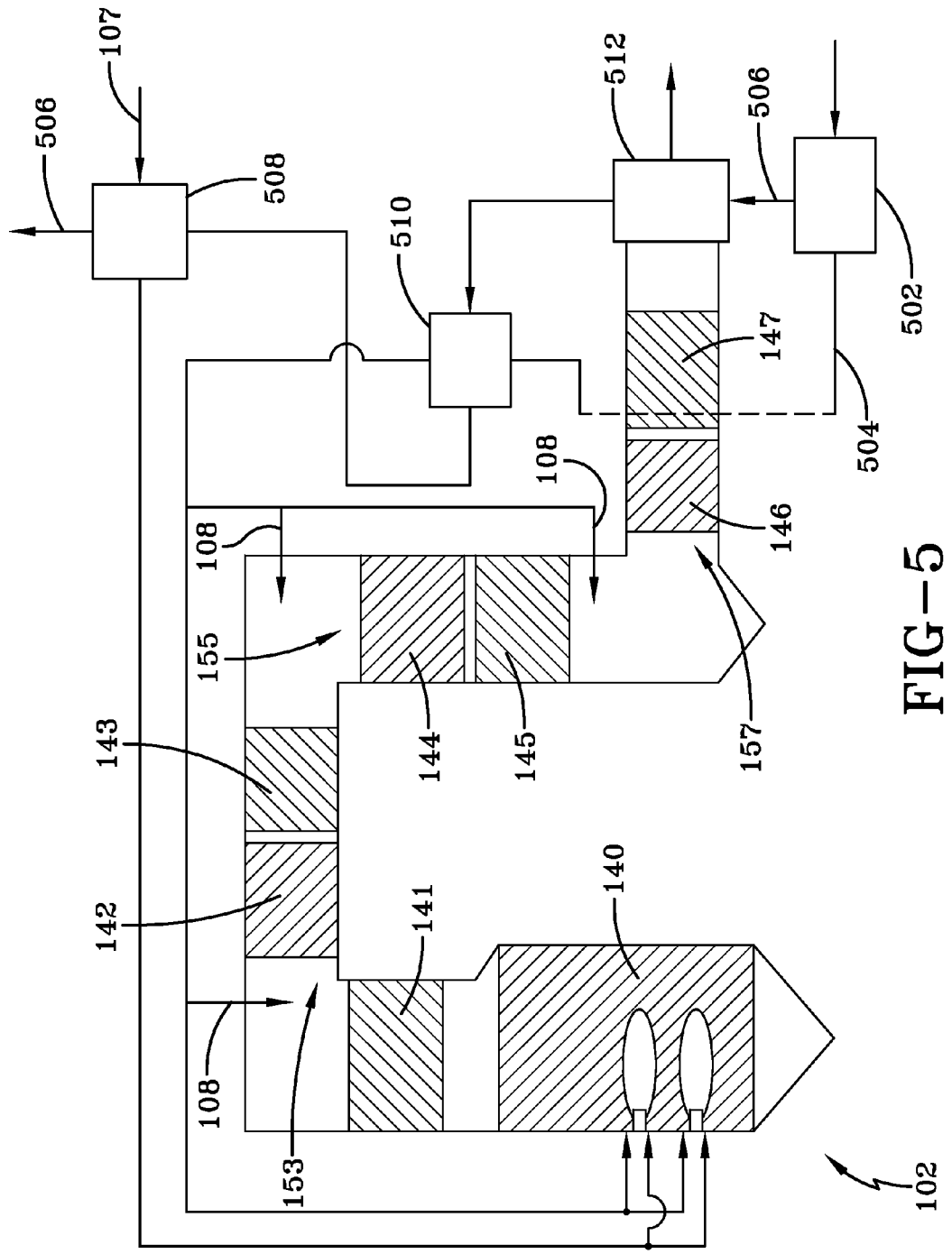
FIG. 5 schematically illustrates an exemplary embodiment of an oxy/fuel system according to the disclosure.

FIG. 5 illustrates a further embodiment of the present disclosure. This embodiment of combustion system 102 may include all features and limitations from the previously described embodiments. In particular, this embodiment may include FGR, although not depicted in FIG. 5. In this embodiment, combustion system 102 includes an oxygen supply system 502. As illustrated in FIG. 5, oxygen supply system 502 may be, for example, an air separation unit (ASU). Air from the ASU is separated into gaseous oxygen 504 and gaseous nitrogen 506 using known equipment and processes. As illustrated, gaseous nitrogen 506 flows to a first external heat exchanger 512 while receiving thermal energy from combustion fluid leaving SH-147. Gaseous nitrogen 506 then flows through a second external heat exchanger 510 where it relinquishes most of its heat to the stream of gaseous oxygen 504. Gaseous oxygen 504 is then distributed as previously described. The warm stream of gaseous nitrogen 506 exits second external heat exchanger 510 and flows to a fuel drier 508 where, by virtue of its inherently low moisture content and slightly elevated temperature, it heats and dries fuel 107 entering combustion system 102. Gaseous nitrogen 506 exhaust thus leaves combustion system 102 with residual fuel moisture at or near ambient temperature, while the heated, dried fuel plus heated oxygen are burned in furnace 104 with increased thermal efficiency as a result of these heat exchange and fuel drying processes.

Oxygen injector 108 downstream of furnace 104 rapidly mixes and releases chemical energy from the combustion fluid despite lower concentrations of chemically active components. Oxygen injector 108 is arranged and disposed for rapid mixing with the combustion fluid. FIG. 6 through 9 illustrate oxygen injectors 108 arranged and disposed for promoting rapid mixing of oxygen with the combustion fluid.

Figure 6:
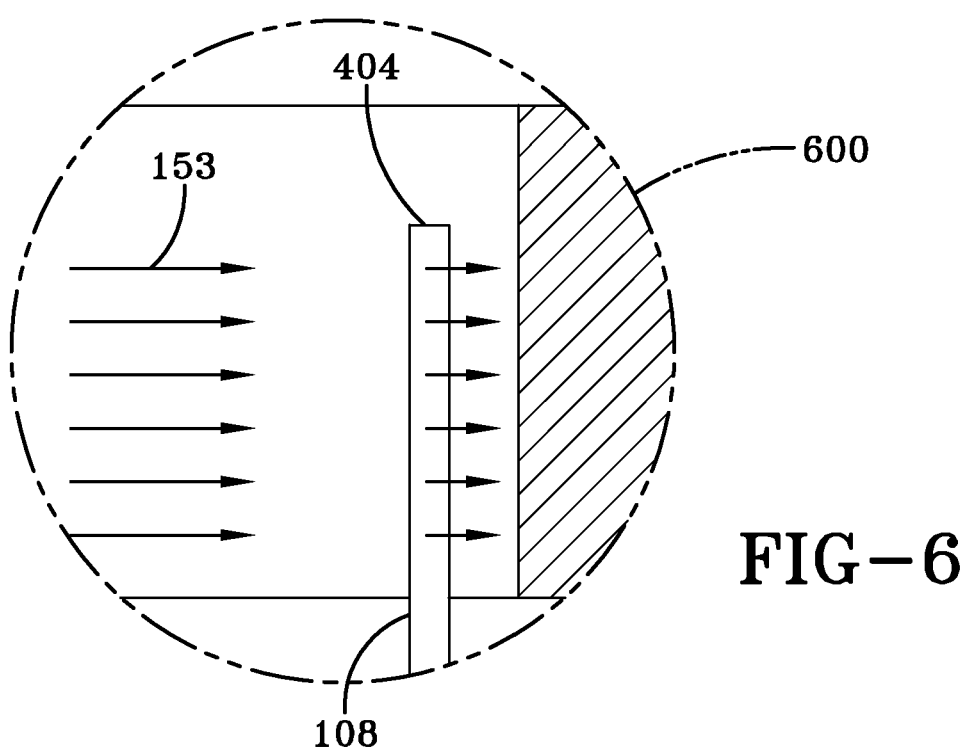
FIG. 6 illustrates a schematic elevation view of a manner of distributing and mixing.

As illustrated in FIGS. 6 through 9, fluid path 153 (which may be fluid path 151, 155, and/or 157) may include a mixing device specifically configured to increase the rate of mixing where oxygen injector 108 and the combustion fluid meet in region 600. Although the illustrated fluid path 153 is depicted in region 600, the mixing device may be used at any location requiring mixing of two fluids, for example oxygen and combustion fluid. Rapid mixing may be desirable for increased efficiency and precision of control. As illustrated in FIG. 6, in one embodiment, a lance 404 may be inserted into fluid path 153 for distributing the oxygen throughout the entire combustion fluid.

Figure 7:
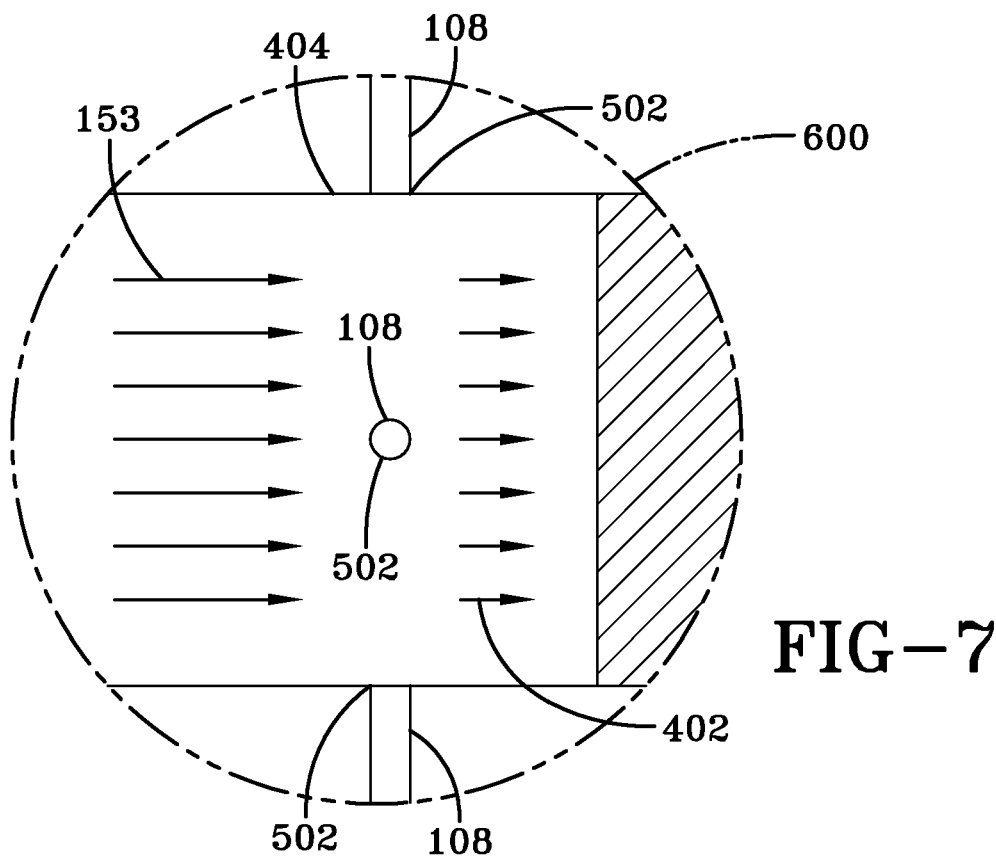
FIG. 7 illustrates a schematic elevation view of a manner of distributing and mixing.
Figure 8:
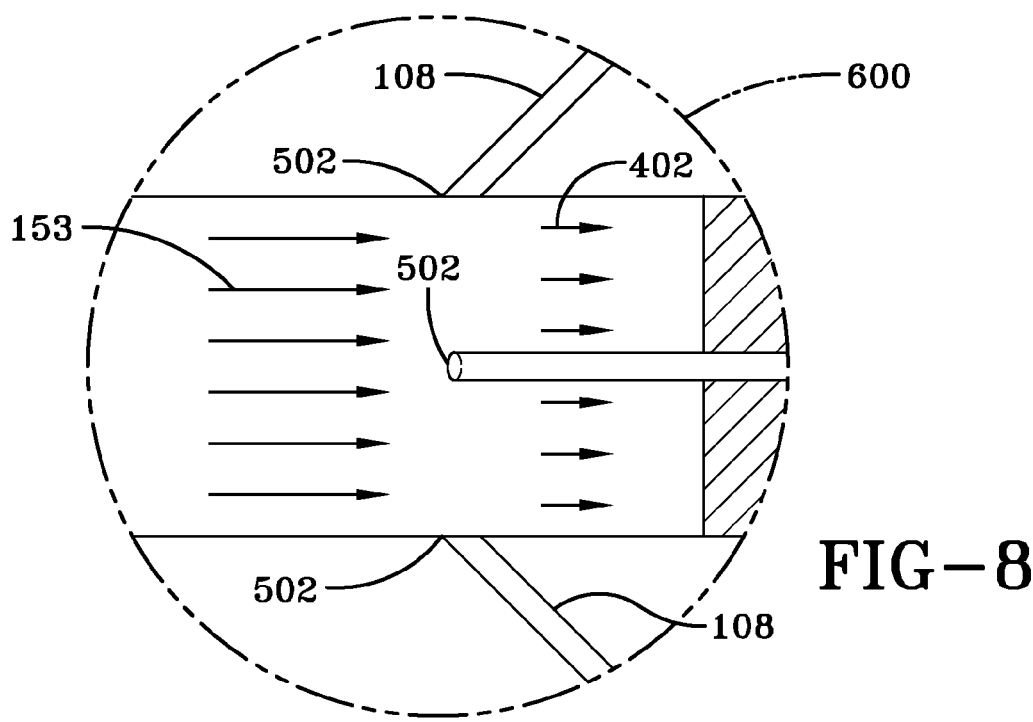
FIG. 8 illustrates a schematic elevation view of a manner of distributing and mixing.
Figure 9:
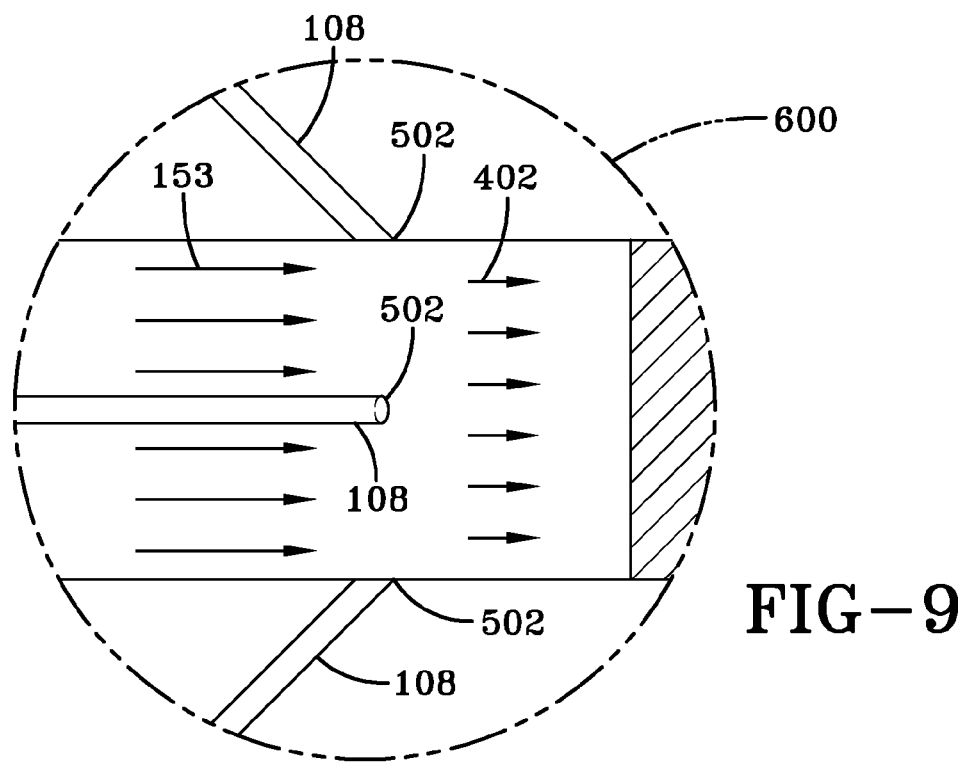
FIG. 9 illustrates a schematic elevation view of a manner of distributing and mixing.

FIG. 7 illustrates another manner of distributing oxygen at fluid path 153 (which may be fluid path 151, 155, and/or 157). In FIG. 7, a plurality of injection nozzles 502 is mounted in close proximity to oxygen injector 108. It will be appreciated that the nozzles 502, which may be of circular or non-circular cross-section, may be oriented at 90 degree angles to the flow of oncoming gas as depicted in FIG. 7, or at different angles. FIG. 8 illustrates nozzle 502 at an angle other than 90 degrees in the direction of the flow of fluid path 153 (which may be fluid path 151, 155, and/or 157). FIG. 9 illustrates nozzle 502 at an angle other than 90 degrees in the opposite direction of the flow of fluid path 153 (which may be fluid path 151, 155, and/or 157). Other arrangements of oxygen injection 108 may be used.

EXAMPLES

Desirable furnace exit gas temperatures are typically in the range of about 2200 to 2550° F. (1200 to 1400° C.), primarily based on tube fouling considerations. Hence, somewhat higher gas temperatures may be acceptable in gas-to-steam heat exchangers, in particular by those using state-of-the-art boiler tube materials, depending upon local heat transfer coefficients. For the purpose of illustration in this example, gas temperatures up to about 2700° F. (1482° C.) entering a gas-to-steam heat exchanger are analyzed.

Possible operating parameters for the above embodiments of this disclosure are expressed through the following example. A high volatile Bituminous coal with properties listed in Table 1 burned with 100% pure oxygen in a system according to the embodiment illustrated by FIG. 1 of the disclosure burns to produce steam to a single reheat turbine-generator generating 600 MW (net) of electrical power. The total heat exchange rate between gas and water/steam is 4700 MMBtu/hr (million British thermal units per hour). The distribution of heat transfer is 3000 MMBtu/hr from gas to (liquid) water and 1700 MMBtu/hr from gas to steam.

TABLE 1

Coal Characteristics for a Typical High Volatile Bituminous Coal

| Proximate Analysis, wt % | $H_2O$ | 2.5 |
|---|---|---|
| | Volatile Matter | 37.6 |
| | Fixed Carbon | 52.9 |
| | Ash | 7 |
| Ultimate Analysis, wt % | $H_2O$ | 2.5 |
| | C | 75 |
| | H | 5 |
| | S | 2.3 |
| | O | 6.7 |
| | N | 1.5 |
| HHV, BTU/lb | | 13000 |

An equilibrium chemical reaction model coupled with heat and mass balances around individual system components was used to determine operating strategies that yield acceptable operating conditions for the following three different Examples:

Example 1. No FGR

Example 2. 1 lb FGR/lb Fuel Used as Transport Gas

Example 3. 2 lb FGR/lb Fuel Used as Transport Gas

To simplify the analysis, the recycled flue gas, when utilized, is assumed to be $CO_2$, and a single distribution of oxygen injector flow rates was employed, with the total oxygen injection rate equal to 2.4% above the stoichiometric requirement for complete combustion. Moreover, the gas temperature exiting the final heat exchange section was maintained at 796° F. (424° C.). The heat transfer taking place in heat exchangers situated between adjacent oxygen injector points was also fixed. The distributions of oxygen injector and heat transfer used in the model calculations are summarized in Tables 2 and 3, respectively.

TABLE 2

| Injector | $O_2$ Injection (% of Stoichiometric Requirement) |
|---|---|
| 701 | 66.4 |
| 702 | 13.9 |
| 703 | 6.9 |
| 704 | 15.2 |
| Total | 102.4 |

TABLE 3

| Heat Transfer Sections | Heat Transfer Duty (MMBtu/hr) |
|---|---|
| WH-140 & SH-141 | 2150 |
| WH-142 & SH-143 | 850 |
| WH-144 & SH-145 | 850 |
| WH-146 & SH-147 | 850 |
| Total | 4700 |

Figure 10:
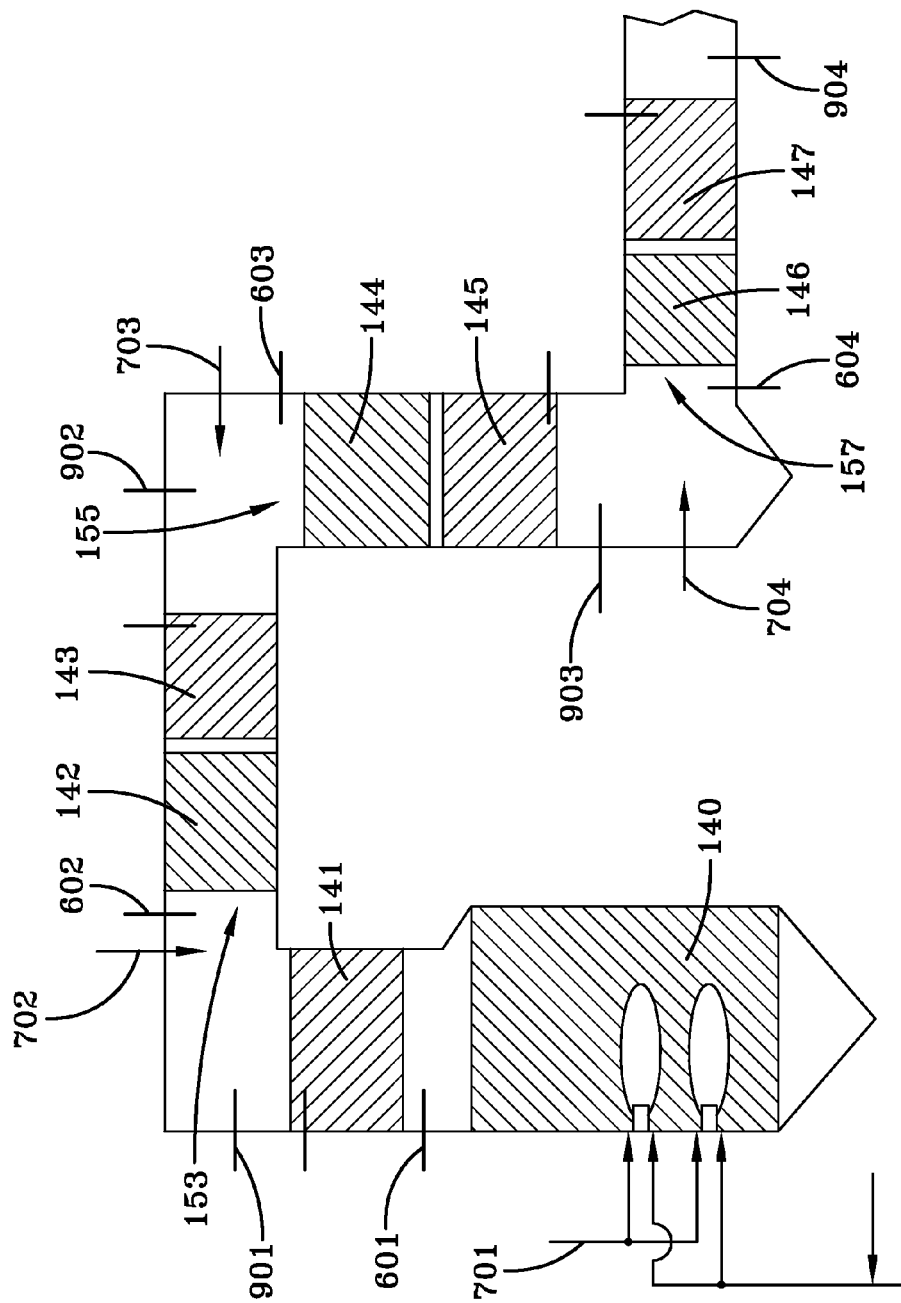
FIG. 10 schematically illustrates an exemplary embodiment of an oxy/fuel system according to the disclosure.
Figure 11:
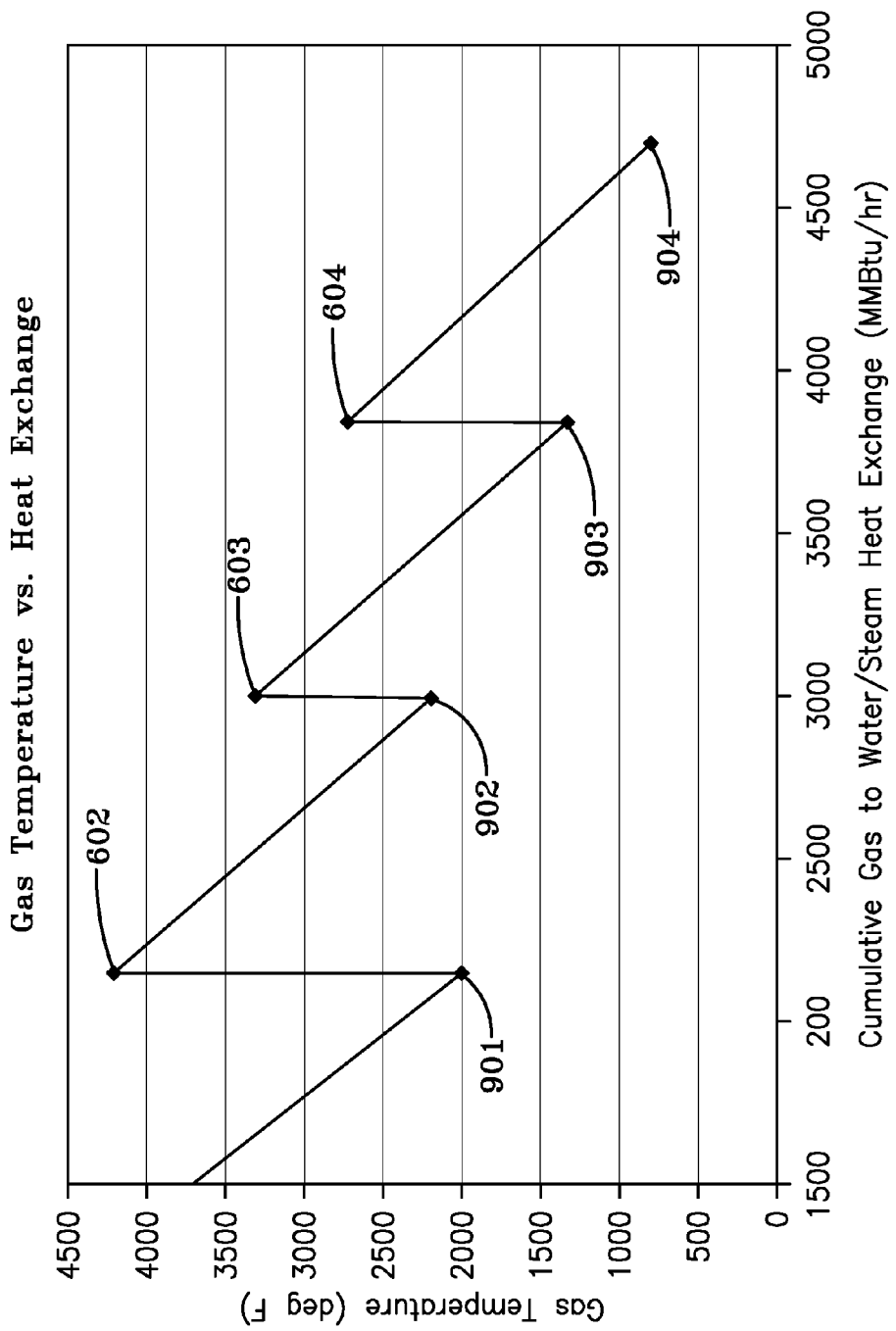
FIG. 11 graphically illustrates the relationship of gas temperature compared to heat transferred according to one embodiment.

FIG. 10, which is representative of the above disclosed embodiments, schematically illustrates the present disclosure. In FIG. 10, four additional points are defined for specification of the calculated gas temperature and/or CO composition downstream of each of the fluid paths, yet upstream of the following heat exchange section. Three of these points are 602, 603, and 604, following, respectively, oxygen injector 702, 703, and 704, but are situated upstream, respectively, of water heating sections WH-143, WH-145 and WH-147 illustrated in FIG. 10. The fourth point 601 is located upstream of SH-141. The gas temperatures calculated for 602, 603, and 604 are adiabatic flame temperatures. Since there will be some heat transfer that occurs in operation, even upstream of the heat exchanger, these temperatures represent upper limits of the actual gas temperature entering the following heat exchanger. Point 901 relates to the measurement from sensor 110 following the first heat exchanger section. The gas temperature calculated for the fourth point 601 is back-calculated from the temperature at point 901 by energy balance across SH-141. Point 902 relates to the measurement from sensor 110 following the second heat exchanger section. Point 903 relates to the measurement from sensor 110 following the third heat exchanger section. Point 904 relates to the measurement from sensor 110 following the fourth heat exchanger section.

Figure 17:
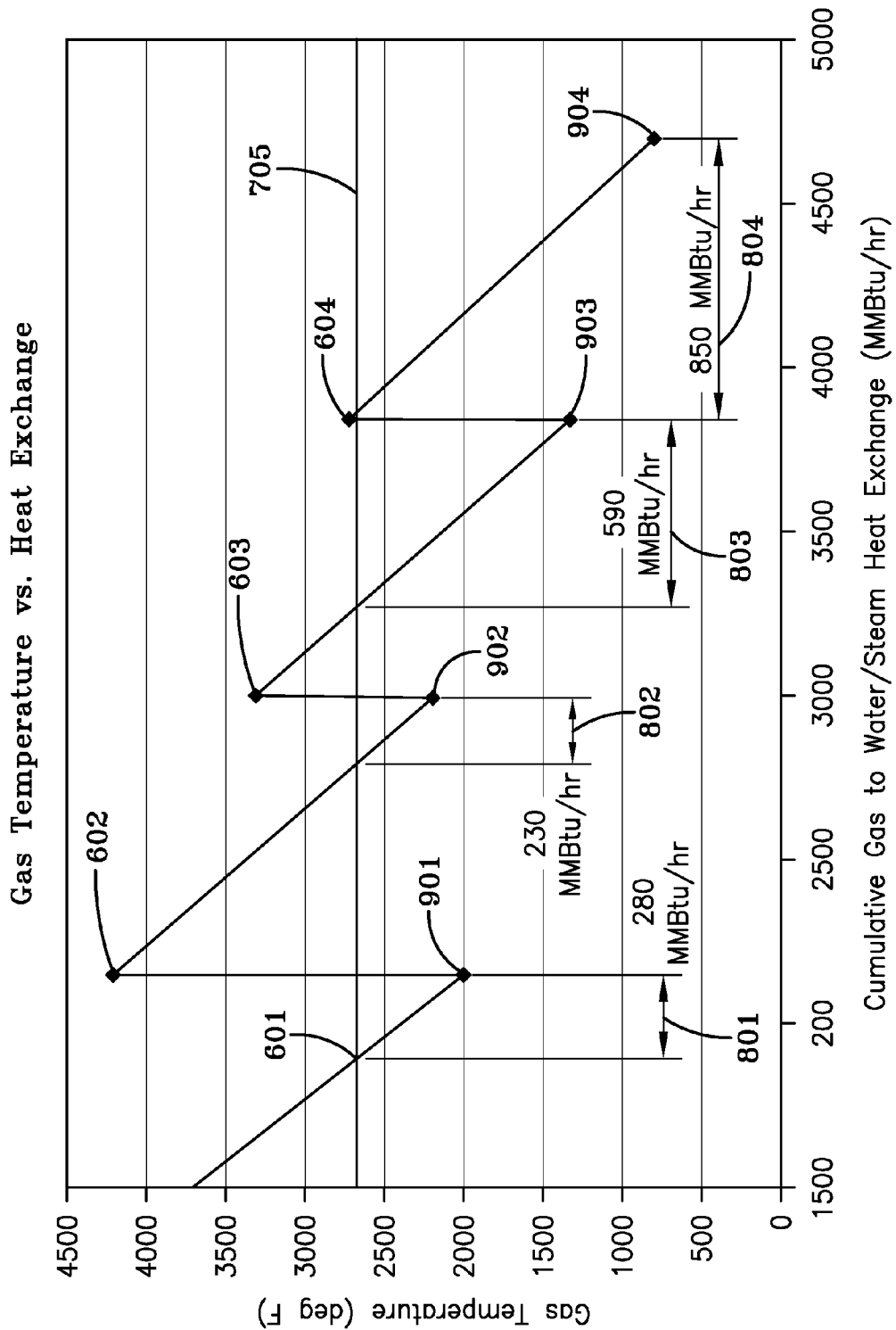
FIG. 17 graphically illustrates the relationship of gas CO concentration compared to heat transferred according to still yet another embodiment.

The division between the water and steam heat exchange sections following each fluid path was determined by superimposing a line of constant gas temperature upon a graph of gas temperature versus cumulative heat exchange. The intersection of this line with the sloping portion of the gas temperature curve represents the point within the heat exchanger section, that is the combined water & steam sections, where the gas temperature equals the assumed constant value. By choosing values of gas temperature that represent reasonable limits for exposure of steam pipes, this allows determination of the proportion of the particular heat exchanger that could provide steam heating duty, the portion of the heat exchanger below the selected gas temperature limit. The process is graphically illustrated in FIG. 17 for Example 1 (no FGR) and a gas temperature limit 705 of about 2700° F. (1482° C.). According to the results presented on this Figure, approximately 1950 MMBtu/hr of energy can be transferred from gas to steam at or below a gas temperature of about 2700° F. (1482° C.). Those regions that are acceptable for transferring heat from gas to steam using this criterion are labeled on the Figure as 801, 802, 803, and 804, which may be incorporated, in whole or in part, into SH-141, SH-143, SH-145, and SH-147, respectively. Comparing this to the overall steam heating requirement of 1700 MMBtu/hr indicates that the system is feasible, so long as thermodynamic constraints are not violated. That is, the local gas temperature exceeds the local steam temperature allowing heat transfer to occur from gas to steam. Since the final gas temperature leaving the final heat exchanger is nominally about 800° F. (427° C.), this suggests that the final region of this section may be best suited for initial heating of relatively low temperature steam, rather than final heating of relatively high temperature steam.

Results of the analysis for all three Examples at gas temperature levels of about 2300° F. (1260° C.), about 2500° F. (1371° C.), and about 2700° F. (1482° C.) are summarized in Table 4.

TABLE 4

| Example | Heat Exchange Below 2300° F. | Heat Exchange Below 2500° F. | Heat Exchange Below 2700° F. |
|---|---|---|---|
| 1 | 1245 MMBtu/hr | 1610 MMBtu/hr | 1950 MMBtu/hr |
| 2 | 1925 MMBtu/hr | 2235 MMBtu/hr | 2615 MMBtu/hr |
| 3 | 2425 MMBtu/hr | 2765 MMBtu/hr | 2990 MMBtu/hr |

Figure 12:
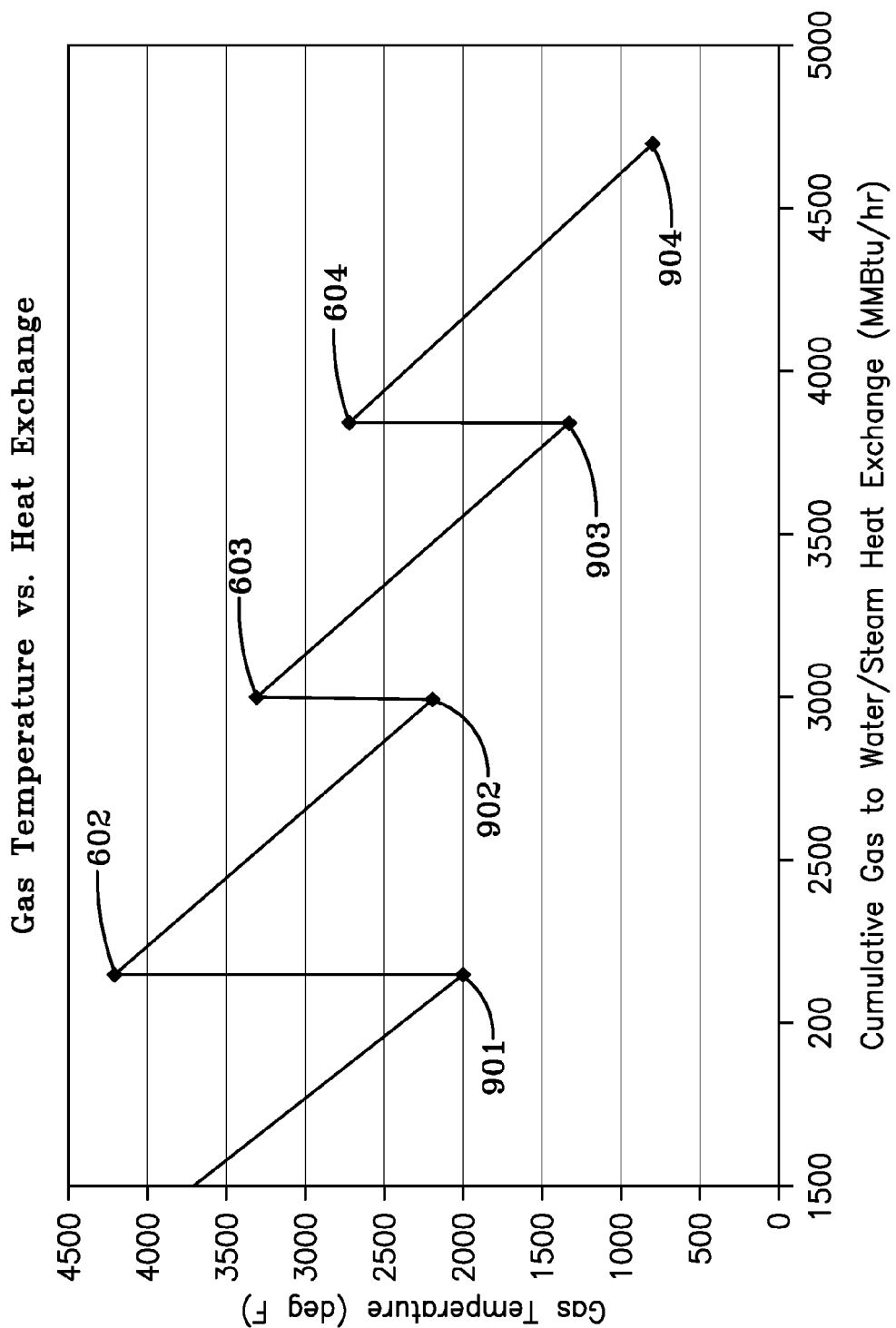
FIG. 12 graphically illustrates the relationship of gas temperature compared to heat transferred according to another embodiment.
Figure 13:
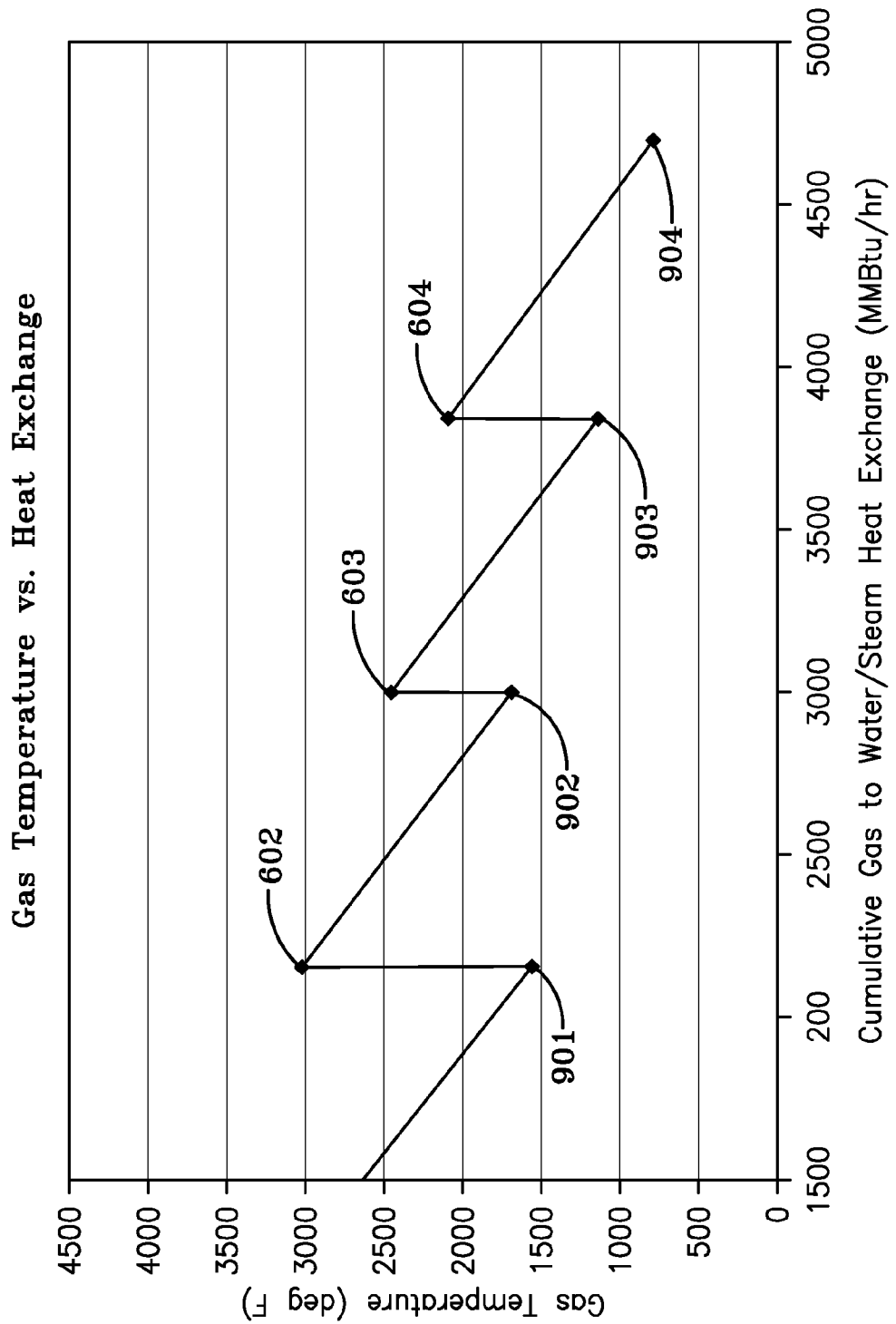
FIG. 13 graphically illustrates the relationship of gas temperature compared to heat transferred according to yet another embodiment.
Figure 14:
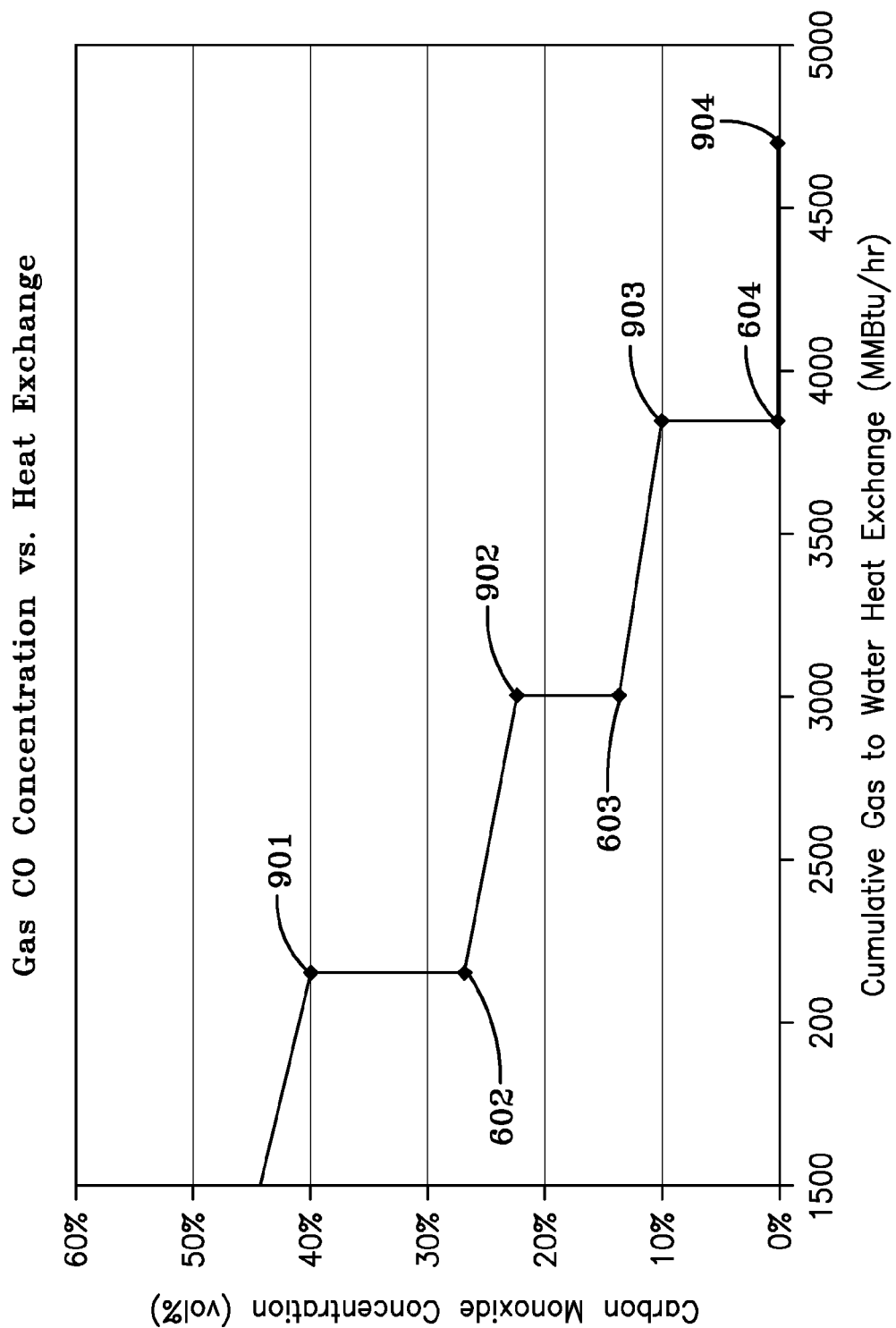
FIG. 14 graphically illustrates the relationship of gas CO concentration compared to heat transferred according to one embodiment.
Figure 15:
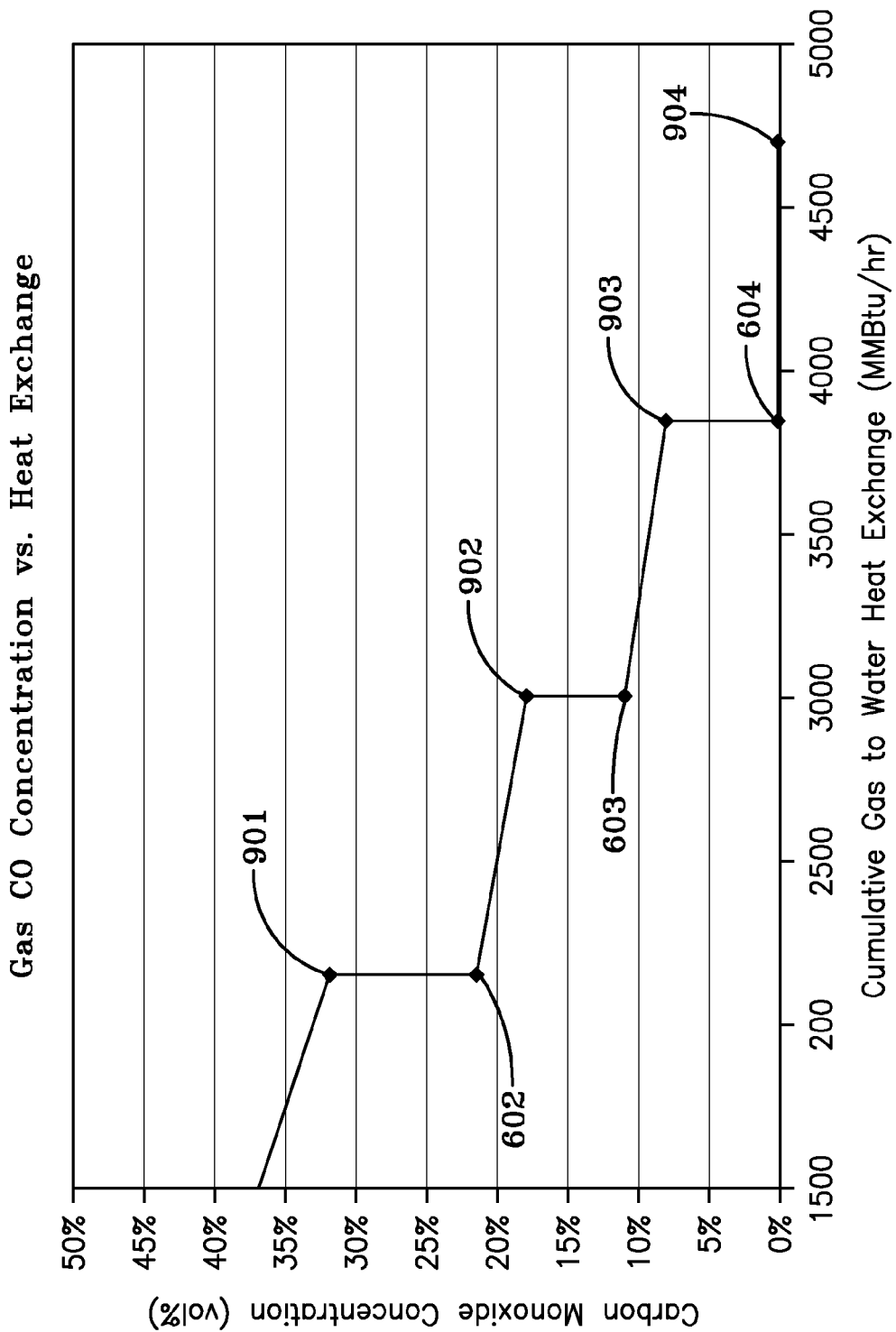
FIG. 15 graphically illustrates the relationship of gas CO concentration compared to heat transferred according to another embodiment.
Figure 16:
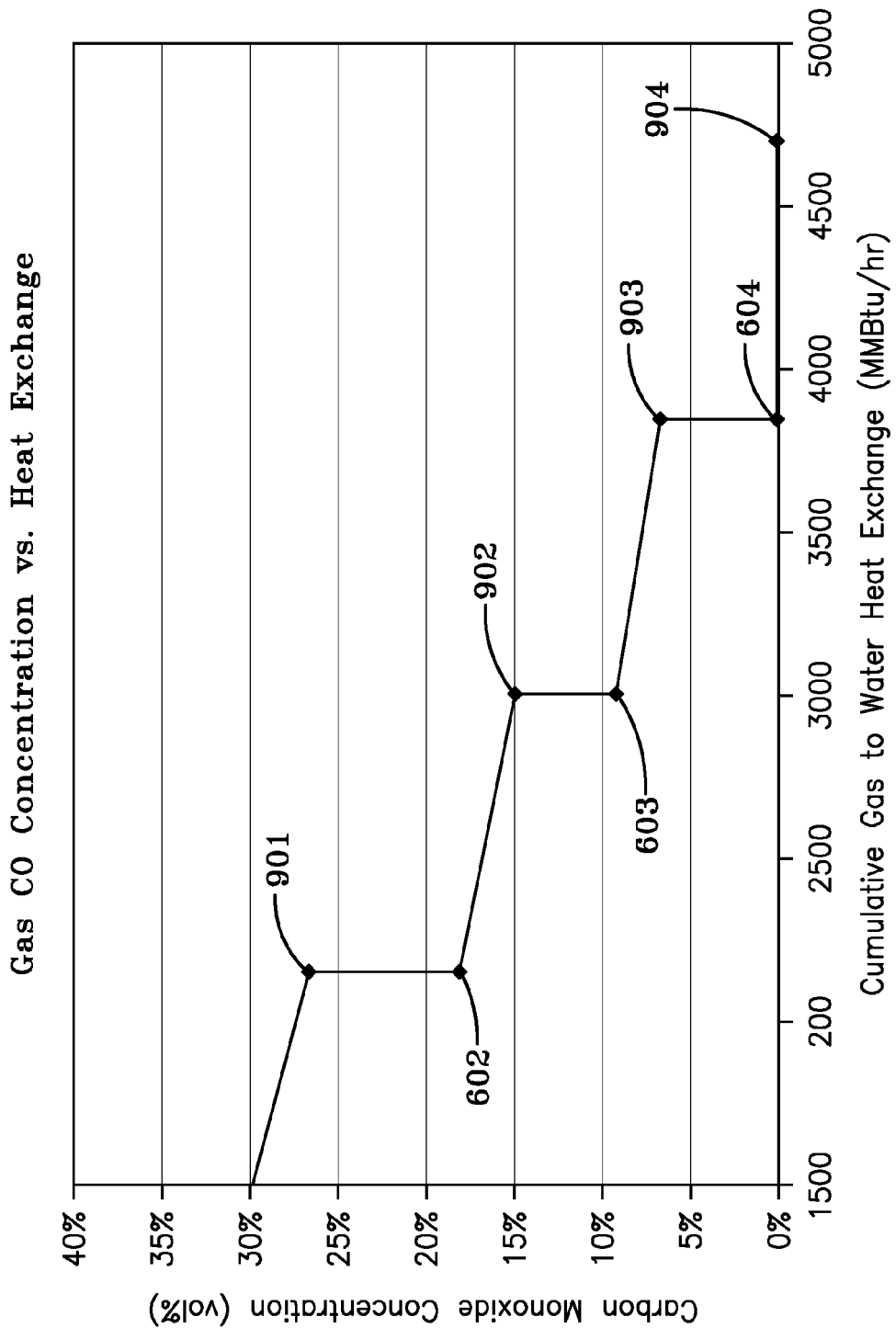
FIG. 16 graphically illustrates the relationship of gas CO concentration compared to heat transferred according to yet another embodiment.

These results reveal instances where heat exchange rates are above 1700 MMBtu/hr and have sufficient energy available for fulfilling the steam superheating requirements at gas temperatures at or below the stated value. Hence, these same conditions are viable for the practice of this invention. Moreover, in certain Examples, for example Examples 2 and 3, adiabatic gas temperatures following oxygen injector are low enough to preclude the need for having a first gas to water heat exchanger in every section (see FIGS. 12 and 13).

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An oxy/fuel combustion system comprising:
a furnace arranged and disposed to receive fuel and oxygen and combust the fuel and the oxygen to form a combustion fluid;
a plurality of heat exchanger sections arranged and disposed to receive heat from the combustion fluid; wherein each section comprises an upstream end having a liquid water heat transfer and a downstream end having a steam heat transfer;
a plurality of oxygen injectors arranged and disposed to provide oxygen to the combustion fluid to controllably adjust composition of the combustion fluid and temperature of the combustion fluid,
an oxygen supply system arranged and disposed to produce oxygen and a by-product substantially comprising nitrogen gas; and,
a first heat exchanger arranged and disposed to transfer heat from the combustion fluid to the by-product and a second heat exchanger arranged and disposed to transfer heat from the by-product to the oxygen.

2. The combustion system of claim 1, wherein the fuel is a solid fuel.

3. The combustion system of claim 2, further comprising a flue gas recycle configuration arranged and disposed for transporting the solid fuel to the furnace.

4. The combustion system of claim 2, further comprising a flue gas recycle configuration arranged and disposed only for transporting the solid fuel to the furnace.

5. The combustion system of claim 1, further comprising a measuring device arranged in the system in close proximity to the plurality of oxygen injectors and disposed to measure a property selected from the group consisting of temperature of the combustion fluid, composition of the combustion fluid, temperature of the heat exchanger sections, temperature of a medium receiving heat from the combustion fluid, and combinations thereof.

6. The combustion system of claim 5, further comprising a control system arranged and disposed for adjusting oxygen injection rates and fuel injection rates in response to measurements performed by the measuring device.

7. The combustion system of claim 1, wherein the furnace further comprises a separate chamber arranged and disposed to remove slag.

8. The combustion system of claim 1, wherein the combustion system is substantially devoid of a flue gas recycle configuration.

9. The combustion system of claim 2, wherein the by-product exiting the second heat exchanger is configured to be utilized as a medium for drying the fuel.

10. The combustion system of claim 1, wherein each of the heat exchanger sections comprise a liquid heating section followed by a vapor heating section.

11. The combustion system of claim 1, wherein one or more of the plurality of oxygen injectors are arranged between the heat exchanger sections.

12. The combustion system of claim 1, wherein the oxygen injected into the furnace is less than or equal to 80 percent of the stoichiometric requirement for complete combustion of the fuel.

13. An oxy/fuel combustion system comprising:
a furnace arranged and disposed to receive fuel and oxygen and combust the fuel and the oxygen to form a combustion fluid;
a plurality of heat exchanger sections arranged and disposed to receive heat from the combustion fluid;
a plurality of oxygen injectors arranged and disposed to provide oxygen to the combustion fluid to controllably adjust composition of the combustion fluid and temperature of the combustion fluid,
an oxygen supply system arranged and disposed to produce oxygen and a by-product substantially comprising nitrogen gas;
a first heat exchanger arranged and disposed to transfer heat from the combustion fluid to the by-product and a second heat exchanger arranged and disposed to transfer heat from the by-product to the oxygen; and,
wherein the by-product exiting the second heat exchanger is configured to be utilized as a medium for drying the fuel.

14. A method of controlling fuel combustion comprising:
providing a system comprising a furnace arranged and disposed to receive fuel and oxygen and combust the fuel and the oxygen to form a combustion fluid, a plurality of heat exchanger sections arranged and disposed to receive heat from the combustion fluid wherein each section comprises an upstream end having a liquid water heat transfer and a downstream end having a steam heat transfer, and a plurality of oxygen injectors arranged and disposed to provide oxygen to the combustion fluid to controllably adjust composition of the combustion fluid and temperature of the combustion fluid and wherein an oxygen supply system arranged and disposed to produce oxygen and a by-product substantially comprising nitrogen gas and,
a first heat exchanger arranged and disposed to transfer heat from the combustion fluid to the by-product and a second heat exchanger arranged and disposed to transfer heat from the by-product to the oxygen;

measuring a property selected from the group consisting of temperature of the combustion fluid, composition of the combustion fluid, temperature of the heat exchanger sections, temperature of a medium receiving heat from the combustion fluid, and combinations thereof, the measuring being accomplished in close proximity to the oxygen injectors; and providing oxygen, fuel, or a combination of oxygen and fuel in response to the property.

15. The method of claim 14, further comprising providing sufficient oxygen and fuel to adjust the chemical heat release from fuel.

16. The method of claim 15, wherein the amount of oxygen and fuel provided is adjusted to control the temperature of the combustion fluid and the rates of heat transfer between the combustion fluid and the heat exchange sections.

17. The method of claim 15, wherein the heat exchanger section temperatures are measured, the heat exchanger section temperatures being adjustable by providing a controlled chemical energy release from the fuel.

18. The method of claim 15, wherein the chemical energy released from the fuel is adjusted by adjusting the rate of oxygen injection.

19. The method of claim 14, further comprising measuring concentration of CO in the combustion fluid, the concentration of CO being adjustable by adjusting the rate of oxygen injection in at least one of the oxygen injectors.

20. The method of claim 14, further comprising measuring a temperature of the combustion fluid and adjusting the rate of oxygen injection in at least one of the oxygen injectors in response to the temperature of the combustion fluid.

21. The method of claim 14, further comprising measuring a combustion fluid temperature and activating an ignition source in response to the combustion fluid temperature.

22. The method of claim 14, further comprising injecting the oxygen into the furnace at less than or equal to 80 percent of the stoichiometric requirement for complete combustion of the fuel.

23. The method of claim 14, wherein the fuel is a solid fuel.

24. The method of claim 23, wherein the system further comprises a flue gas recycle configuration arranged and disposed for transporting the solid fuel to the furnace.

25. The method of claim 23, wherein the system further comprises a flue gas recycle configuration arranged and disposed only for transporting the solid fuel to the furnace.

26. The combustion system of claim 1 further comprising a fluid path between the heat exchanger sections.

27. The combustion system of claim 26 wherein at least one sensor is disposed to measure at least one parameter of the fluid path.

* * * * *